(12) United States Patent
Kofuji et al.

(10) Patent No.: US 12,012,663 B2
(45) Date of Patent: Jun. 18, 2024

(54) CARBON DIOXIDE ELECTROLYSIS DEVICE

(71) Applicant: KABUSHIKI KAISHA TOSHIBA, Tokyo (JP)

(72) Inventors: Yusuke Kofuji, Yokohama (JP); Akihiko Ono, Kita (JP); Yuki Kudo, Yokohama (JP); Ryota Kitagawa, Setagaya (JP); Masakazu Yamagiwa, Yokohama (JP); Jun Tamura, Kita (JP); Satoshi Mikoshiba, Yamato (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 479 days.

(21) Appl. No.: 17/446,472

(22) Filed: Aug. 31, 2021

(65) Prior Publication Data

US 2022/0298655 A1   Sep. 22, 2022

(30) Foreign Application Priority Data

Mar. 18, 2021  (JP) ................. 2021-044783

(51) Int. Cl.
| | | |
|---|---|---|
| C25B 9/19 | (2021.01) | |
| C25B 1/23 | (2021.01) | |
| C25B 3/26 | (2021.01) | |
| C25B 9/65 | (2021.01) | |
| C25B 13/08 | (2006.01) | |

(52) U.S. Cl.
CPC .............. *C25B 9/19* (2021.01); *C25B 1/23* (2021.01); *C25B 9/65* (2021.01); *C25B 13/08* (2013.01); *C25B 3/26* (2021.01)

(58) Field of Classification Search
None
See application file for complete search history.

(56) References Cited

U.S. PATENT DOCUMENTS

| | | | |
|---|---|---|---|
| 7,241,367 B1 * | 7/2007 | Wang ............... | C25B 13/08 |
| | | | 210/500.36 |
| 11,421,327 B2 * | 8/2022 | Sone ............... | C25B 15/02 |
| 2003/0113605 A1 | 6/2003 | Hidaka et al. | |
| 2017/0314145 A1 | 11/2017 | Mitsushima et al. | |
| 2017/0321334 A1 * | 11/2017 | Kuhl ............... | C25B 13/08 |

(Continued)

FOREIGN PATENT DOCUMENTS

| | | |
|---|---|---|
| EP | 3 222 754 A1 | 9/2017 |
| JP | 06-320164 A | 11/1994 |
| JP | 2003-151346 A | 5/2003 |

(Continued)

*Primary Examiner* — Harry D Wilkins, III
(74) *Attorney, Agent, or Firm* — Oblon, McClelland, Maier & Neustadt, L.L.P.

(57) ABSTRACT

A carbon dioxide electrolysis device, includes: an anode configured to oxidize water or a hydroxide ion and thus generate oxygen; an anode solution flow path configured to supply an anode solution to the anode; a cathode configured to reduce carbon dioxide to generate a carbon compound; a gas flow path configured to supply a gas to the cathode, the gas containing carbon dioxide; a diaphragm provided between the anode and the cathode and including a porous film with a hydrophilic polymer supported thereon; and a protective member provided between the anode and the diaphragm and protecting the diaphragm.

14 Claims, 2 Drawing Sheets

(56) References Cited

U.S. PATENT DOCUMENTS

2020/0240023 A1 7/2020 Cave et al.
2020/0270756 A1 8/2020 Kofuji et al.

FOREIGN PATENT DOCUMENTS

| | | |
|---|---|---|
| JP | 2004-134269 A | 4/2004 |
| JP | 2004-134294 A | 4/2004 |
| JP | 2019-166500 A | 10/2019 |
| JP | 2020-132965 A | 8/2020 |
| WO | WO 2013/183584 A1 | 12/2013 |
| WO | WO 2019/051609 A1 | 3/2019 |
| WO | WO 2020/112919 A1 | 6/2020 |
| WO | WO 2020/158719 A1 | 8/2020 |

* cited by examiner

CARBON DIOXIDE ELECTROLYSIS DEVICE

CROSS-REFERENCE TO RELATED APPLICATION

This application is based upon and claims the benefit of priority from Japanese Patent Application No. 2021-044783, filed on Mar. 18, 2021; the entire contents of which are incorporated herein by reference.

FIELD

Embodiments described herein relate generally to a carbon dioxide electrolysis device.

BACKGROUND

In recent years, renewable energy such as solar power is desirably converted into not only electrical energy for use but also a storable and transportable resource in terms of both energy and environmental issues. This demand has advanced research and development of artificial photosynthesis technology, which uses sunlight to produce chemical substances like photosynthesis in plants. This technology has potential to store the renewable energy as storable fuel and is also expected to create value by producing chemical substances that can be used as industrial raw materials.

Know examples of a device which uses renewable energy such as sunlight to generate chemical substances, include an electrochemical reaction device which has a cathode and a anode, the cathode being for reducing carbon dioxide ($CO_2$) generated from a carbon dioxide supply source such as a power plant and a refuse disposal plant, and the anode being for oxidizing water ($H_2O$). The cathode enables to reduce carbon dioxide to generate a carbon compound such as carbon monoxide (CO), for example.

DETAILED DESCRIPTION

A carbon dioxide electrolysis device, includes: an anode configured to oxidize water or a hydroxide ion and thus generate oxygen; an anode solution flow path configured to supply an anode solution to the anode; a cathode configured to reduce carbon dioxide to generate a carbon compound; a gas flow path configured to supply a gas to the cathode, the gas containing carbon dioxide; a diaphragm provided between the anode and the cathode and including a porous film with a hydrophilic polymer supported thereon; and a protective member provided between the anode and the diaphragm and protecting the diaphragm.

Hereinafter, embodiments will be described with reference to the drawings. In respective embodiments described below, substantially the same constituent parts are denoted by the same reference signs and description thereof may be partially omitted. The drawings are schematic, and relation of thickness and planar dimension, a thickness ratio among parts, and so on may be different from actual ones.

In this specification, a term "connecting" includes not only direct connecting but also indirect connecting unless otherwise specified.

Figure 1:
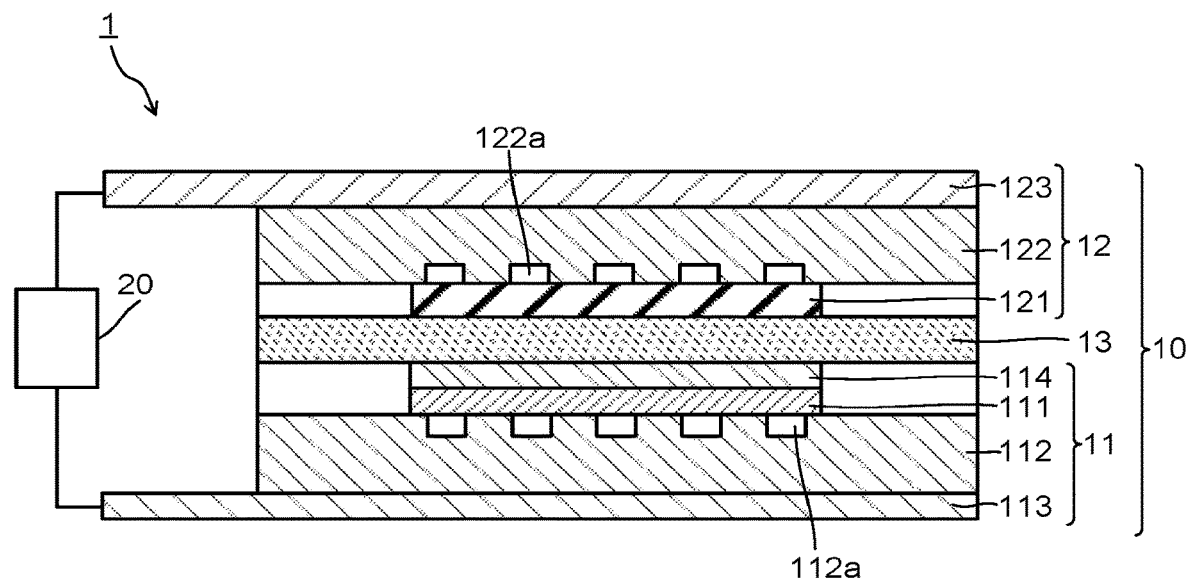
FIG. 1 is a schematic diagram for explaining a configuration example of a carbon dioxide electrolysis device.
Figure 2:
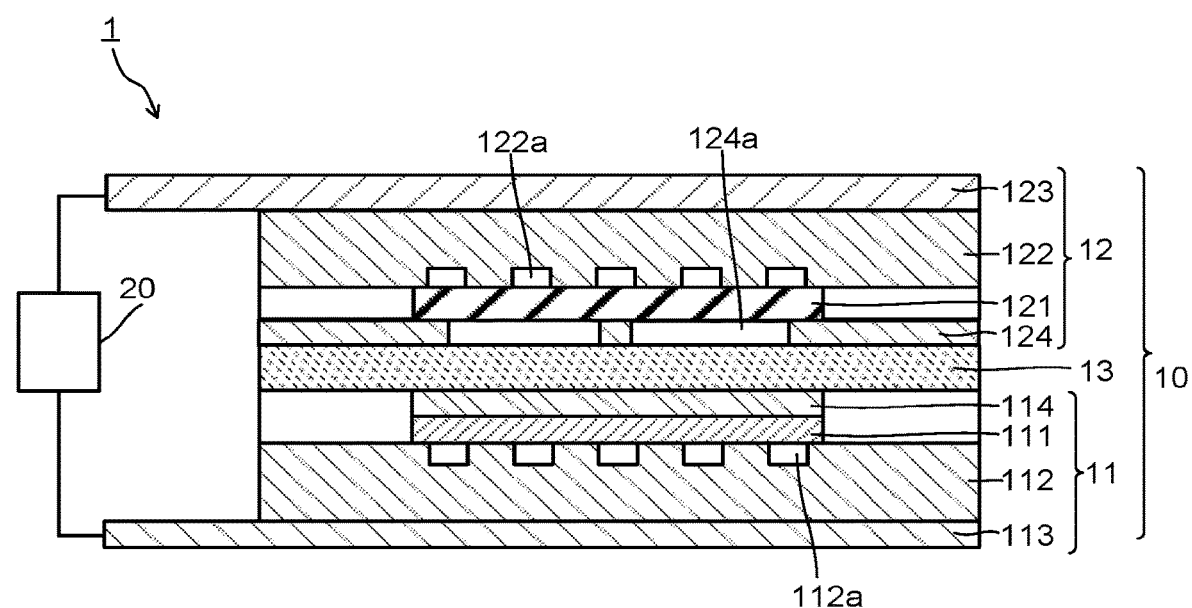
FIG. 2 is a schematic diagram for explaining another configuration example of the device.

FIG. 1 is a schematic diagram for explaining a configuration example of a carbon dioxide electrolysis device. FIG. 2 is a schematic diagram for explaining another configuration example of the device. FIG. 1 and FIG. 2 illustrate a carbon dioxide electrolysis device 1 which has an electrolysis cell 10.

The electrolysis cell 10 includes an anode part 11, a cathode part 12, a diaphragm 13 separating the anode part 11 and the cathode part 12.

The anode part 11 includes an anode 111, an anode solution flow path 112a provided in a flow path plate 112, an anode current collector 113, and a protective member 114.

The cathode part 12 includes a cathode 121, a gas flow path 122a provided in a flow path plate 122, and a cathode current collector 123.

The anode 111 is an electrode (oxidation electrode) which activates an oxidation reaction of water ($H_2O$) in an anode solution to generate oxygen ($O_2$) and hydrogen ions ($H^+$) or activates an oxidation reaction of hydroxide ions ($OH^-$) generated in the cathode part 12 to generate oxygen and water.

The anode 111 is placed between the protective member 114 and the flow path plate 112 in a manner to be provided on the protective member 114 and the flow path plate 112. A first surface of the anode 111 is provided on the protective member 114. A second surface of the anode 111 is provided on the opposite side of the anode 111 from the first surface and faces on the anode solution flow path 112a.

A chemical compound generated by the oxidation reaction of the anode 111 varies depending on a kind of an oxidation catalyst and other factors. When an electrolytic solution is used as the anode solution, the anode 111 can oxidize water ($H_2O$) to generate oxygen and a hydrogen ion, or oxidize hydroxide ions ($OH^-$) to generate water and oxygen, and the anode 111 is preferably mainly constituted by a catalyst material (anode catalyst material) capable of decreasing overvoltage of such a reaction. Examples of such a catalyst material include a metal such as platinum (Pt), palladium (Pd), or nickel (Ni), an alloy or an intermetallic compound which contains such a metal, a binary metal oxide such as a manganese oxide (Mn—O), an iridium oxide (Ir—O), a nickel oxide (Ni—O), a cobalt oxide (Co—O), an iron oxide (Fe—O), a tin oxide (Sn—O), an indium oxide (In—O), a ruthenium oxide (Ru—O), a lithium oxide (Li—O), or a lanthanum oxide (La—O), a ternary metal oxide such as Ni—Co—O, Ni—Fe—O, La—Co—O, Ni—La—O, or Sr—Fe—O, a quaternary metal oxide such as Pb—Ru—Ir—O, or La—Sr—Co—O, and a metal complex such as a Ru complex or a Fe complex.

The anode 111 preferably has a substrate (support) with a structure enabling the anode solution or ions to move between the diaphragm 13 as well as the protective member 114 and the anode solution flow path 112a, that is, for example, a porous structure such as a mesh material, a punched material, or a porous member. The substrate with the porous structure includes one with relatively large pores, such as a metal fiber sintered body. The substrate may be constituted by a metal material such as a metal like titanium (Ti), nickel (Ni), or iron (Fe), or an alloy (SUS, for example) which contains at least one of the above metals, or may be constituted by the aforementioned anode catalyst material. When an oxide is used as the anode catalyst material, it is preferable to form a catalyst layer by attaching or laminating the anode catalyst material to a surface of the substrate made of the aforementioned metal material. The anode catalyst material preferably has a form of a nanoparticle, a nanostructure, a nanowire, or the like in order to enhance the oxidation reaction. The nanostructure is a structure obtained by forming nanoscale irregularities on a surface of the catalyst material. Further, the oxidation catalyst is not necessarily required to be provided in the oxidation electrode. An oxidation catalyst layer provided other than in the oxidation electrode may be electrically connected to the oxidation electrode.

The cathode 121 is an electrode (reduction electrode) which causes a reduction reaction of carbon dioxide or a reduction reaction of a reduction product, to generate a carbon compound.

The cathode 121 is preferably constituted by an ion-conductive material, in addition to an electrode substrate and a metal catalyst supported on a carbon material. The ion-conductive material achieves an action of giving and receiving ions between the metal catalysts included in a layer, and has an effect to improve electrode activity.

A cation exchange resin or an anion exchange resin is preferably used as the aforementioned ion-conductive material. Known examples of these resins are polymers with ion modifying groups and include a cationic polymer with a perfluorosulfonic acid group. More specific examples of the resins include the cation exchange resin such as Nafion (registered trademark) manufactured by DuPont or Flemion (registered trademark) manufactured by AGC Inc., and the anion exchange resin such as DIAION (registered trademark) manufactured by Mitsubishi Chemical Corporation or Sustainion (registered trademark) manufactured by Dioxide Materials, Inc.

The support of the metal catalyst preferably has a porous structure. Examples of the usable material include, in addition to the aforementioned materials, for example, carbon black such as Ketjen black or Vulcan XC-72, activated carbon, carbon nanotube, and so on. The presence of the porous structure increases an area of an active surface which contributes to an oxidation-reduction reaction to enhance a conversion efficiency.

It is preferable that not only the support but also the catalyst layer itself formed on the substrate has a porous structure, to thereby have many relatively large pores. More specifically, it is preferable that, in a pore size distribution of the catalyst layer as measured by a mercury pressure-injection method, a distribution frequency of pores is maximum in a range of 5 m or more and 200 μm or less in diameter. In this case, a gas diffuses quickly throughout the catalyst layer and a reduction product is easily discharged out of the catalyst layer through this path, resulting in a highly efficient electrode.

In order to supply carbon dioxide efficiently to the catalyst layer, it is preferable to have a gas diffusion layer in the electrode substrate supporting the catalyst layer. The gas diffusion layer is formed of a conductive porous member. When the gas diffusion layer is formed of a water-repellent porous member, it is possible to decrease an amount of water generated by the reduction reaction or water having moved from an oxidation side and to discharge the water through a reduction flow path, thereby desirably increasing a ratio of a carbon dioxide gas in the porous member.

If a thickness of the gas diffusion layer is extremely small, uniformity across the cell surface is impaired, which is not desirable. On the other hand, if the thickness is extremely large, a material cost increases and the efficiency decreases due to an increase in gas diffusion resistance, which is not desirable. When a denser diffusion layer (mesoporous layer) is provided between the gas diffusion layer and the catalyst layer in order to improve diffusivity, water repellency and porosity are changed, thereby promoting gas diffusion and discharge of a liquid component, which is more desirable.

As the metal catalyst supported on the aforementioned support, a material which decreases activation energy for reducing hydrogen ions or carbon dioxide can be mentioned. In other words, there can be mentioned a metal material which lowers overvoltage at the time of generating a carbon compound by a reduction reaction of carbon dioxide. It is preferable to use, for example, at least one metal selected from the group consisting of gold (Au), silver (Ag), copper (Cu), platinum (Pt), palladium (Pd), nickel (Ni), cobalt (Co), iron (Fe), manganese (Mn), titanium (Ti), cadmium (Cd), zinc (Zn), indium (In), gallium (Ga), lead (Pb), and tin (Sn), a metal oxide thereof, or an alloy containing such a metal. The metal catalyst is not limited to the above but a metal complex such as a ruthenium (Ru) complex or a rhenium (Re) complex, for example, can be used as the reduction catalyst. Further, a plurality of materials may be mixed. It is possible to use various forms of metal catalysts, such as a plate shape, a mesh shape, a wire shape, a particle shape, a porous shape, a thin-film shape, an island shape, and so on. Further, the cathode catalyst material preferably has a shape of a nanoparticle, a nanostructure, a nanowire, or the like, in order to enhance the oxidation reaction.

When the metal nanoparticle is used for the metal catalyst, an average diameter thereof is preferably 1 nm or more and 15 nm or less, more preferably 1 nm or more and 10 nm or less, and further preferably 1 nm or more and 5 nm or less. When this condition is satisfied, a surface area of metal per catalyst weight becomes large to thereby bring about high activity by a small amount of metal, which is desirable.

The chemical compound generated by the reduction reaction varies depending on a kind of the metal catalyst functioning as the reduction catalyst or other factors. The chemical compound generated by the reduction reaction is, for example, a carbon compound such as carbon monoxide (CO), formic acid (HCOOH), methane ($CH_4$), methanol ($CH_3OH$), ethane ($C_2H_6$), ethylene ($C_2H_4$), ethanol ($C_2H_5OH$), formaldehyde (HCHO), or ethylene glycol, for example, or hydrogen.

The anode current collector 113 and the cathode current collector 123 can be connected to the power supply 20. Examples of the power supply 20 are not limited to an ordinary system power supply or a battery, but may include a power supply which supplies electric power generated by renewable energy such as solar cell or wind power. The power supply 20 may further have a power controller which adjusts an output of the aforementioned power supply to thereby control voltage between the anode 111 and the cathode 121. The power supply 20 may be provided outside the device 1.

The anode solution flow path 112a has a function to supply the anode solution to the anode 111. The anode solution flow path 112a is constituted by a pit (groove/recess) provided in the flow path plate 112. The flow path plate 112 has an inlet port and an outlet port (both not illustrated) connected to the anode solution flow path 112a, and the anode solution is introduced and discharged by a pump (not illustrated) via these inlet port and outlet port. The anode solution flows within the anode solution flow path 112a in a manner to be provided on the anode 111.

The gas flow path 122a faces on a first surface of the cathode 121. The gas flow path 122a has a function to supply a gas which includes carbon dioxide to the cathode 121. The gas flow path 122a can be connected to a carbon dioxide supply source which supplies the gas that includes carbon dioxide, for example. A facility such as a power plant or a refuse disposal plant, for example, can be mentioned as the carbon dioxide supply source. The gas flow path 122a is constituted by a pit (groove/recess) provided in the flow path plate 122. The flow path plate 122 has an inlet port and an outlet port (both not illustrated) connected to the gas flow path 122a, and the aforementioned gas is introduced and discharged by a pump (not illustrated) via these inlet port and outlet port.

Materials used for the flow path plate 112 and the flow path plate 122 are preferable to be materials with low chemical reactivity and high conductivity. Examples of such materials include, for example, a metal material such as Ti or SUS, carbon, and so on. The flow path plate 122 has an inflow port and an outflow port for each flow path or a screw hole for fastening, which are not illustrated. Further, not-illustrated packings are sandwiched between the front and the back of each flow path plate as necessary.

The flow path plate 122 can have a land which is provided on the cathode 121 for electrical connection with the cathode 121. As a shape of the gas flow path 122a, there can be mentioned shapes such as a shape adjacent to a columnar land and a serpentine shape obtained by bending a long flow path, but the shape is not limited in particular as long as it has a cavity. When the gas flow path 122a is constituted by a plurality of flow paths connected in parallel or a serpentine flow path, or a combination thereof, uniformity of the gas supplied to the cathode 121 can be enhanced to thereby enhance uniformity of electrolytic reactions, which is desirable.

A depth of the gas flow path 122a is preferably small in view of supply of carbon dioxide to the gas diffusion layer and discharge of a liquid, and in view of performing uniform reactions on the cell surface. However, a narrow flow path increases flow path pressure drop, thereby causing energy loss of gas supply or letting the gas pass not through the flow path but through the diffusion layer to hamper the uniform reactions on the cell surface, so that an extremely narrow gas flow path is not preferable.

A carbon dioxide concentration in the gas supplied to the gas flow path 122a is not required to be 100%. In this case, it is also possible to reduce a gas which includes carbon dioxide discharged from various facilities, though an efficiency may be decreased.

A carbon dioxide electrolysis device illustrated in FIG. 2 is different from the device 1 illustrated in FIG. 1 in that the device illustrated in FIG. 2 further has a cathode solution flow path 124a provided in a flow path plate 124. The flow path plate 124 is provided in a cathode part 12. The cathode solution flow path 124a is provided between a cathode 121 and a diaphragm 13 and faces on a second surface on a side opposite to the aforementioned first surface of the cathode 121. The cathode solution flow path 124a has a function to supply a cathode solution to the cathode 121. The cathode solution flow path 124a is constituted by a pit (groove/recess) provided in the flow path plate 124. The cathode solution flows within the cathode solution flow path 124a in a manner to be provided on the cathode 121 and the diaphragm 13. The flow path plate 124 may be formed by using a material usable for a flow path plate 112 or a flow path plate 122, for example.

An aqueous solution containing arbitrary electrolyte can be used as the anode solution and the cathode solution. Examples of the aqueous solution containing electrolyte include an aqueous solution containing at least one ion such as a phosphate ion ($PO_4^{2-}$), a borate ion ($BO_3^{3-}$), a sodium ion ($Na^+$), a potassium ion ($K^+$), a calcium ion ($Ca^{2+}$), a lithium ion ($Li^+$), a cesium ion ($Cs^+$), a magnesium ion ($Mg^{2+}$), a chloride ion ($Cl^-$), a hydrogen carbonate ion ($HCO_3^-$), or a carbonate ion ($CO_3^{2-}$). In addition to the above, it is possible to use an aqueous solution containing $LiHCO_3$, $NaHCO_3$, $KHCO_3$, $CsHCO_3$, phosphoric acid, boric acid, or the like.

Examples of the cathode solution may include an ionic liquid which consists of a salt of a cation such as an imidazolium ion or a pyridinium ion and an anion such as $BF_4^-$ or $PF_6^-$ and is in a liquid state in a broad temperature range, and an aqueous solution thereof. Other examples of the cathode solution include an amine such as ethanolamine, imidazole, or pyridine, or an aqueous solution thereof. The amine may be any one of a primary amine, a secondary amine, and a tertiary amine.

The anode current collector 113 is provided on the opposite side of the flow path plate 112 from a surface on an anode 111. The anode current collector 113 is electrically connected to the anode 111. The anode current collector 113 preferably contains a material with low chemical reactivity and high electrical conductivity. Examples of such materials include a metal material such as Ti or SUS, and carbon.

The cathode current collector 123 is provided on the opposite side of the flow path plate 122 from a surface on the cathode 121. The cathode current collector 123 is electrically connected to the cathode 121. The cathode current collector 123 preferably contains a material with low chemical reactivity and high electrical conductivity. Examples of such materials include a metal material such as Ti or SUS, and carbon.

The diaphragm 13 is provided between the anode 111 and the cathode 121. The diaphragm 13 includes a porous film on which hydrophilic polymer is supported. The porous film includes a hydrophobic material. A contact angle with water in the porous film is 100 degrees or more and less than 180 degrees, for example.

Examples of the porous film preferably include at least one of polytetrafluoroethylene, polyetheretherketone, polyethylene, polyphenylsulfone, polysulfone, polyethersulfone, polyacrylonitrile, polyetherimide, polyamideimide, polyvinylidene fluoride, polycarbonate, polyester, acrylic, nylon, polyolefin, polyurethane, and polypropylene. Among the above, the material of the porous film is preferably one or more selected from the group consisting of polytetrafluoroethylene, polyetheretherketone, and polyvinylidene fluoride, and more preferably polytetrafluoroethylene.

An average pore size of the porous film is preferably 1 nm or more and 500 nm or less, more preferably 1 nm or more and 300 nm or less, and further preferably 1 nm or more and 100 nm or less. When the average pore size is less than 1 nm, migration of electrolytic solution and ions is inhibited and cell voltage increases, which is not desirable. On the other hand, when the average pore size exceeds 500 nm, the electrolytic solution moves from the anode 111 side to the cathode 121 side and the cathode 121 is filled with a liquid such as water, leading to predominance of hydrogen generation being a side reaction, which is not desirable.

The average pore size is specifically determined by a scanning electron microscope (SEM) and a measurement device accompanying the SEM and using pore analysis software. Examples of the measurement device use Phenom Pro manufactured by JASCO International Co., Ltd. and PoroMetric software accompanying Phenom Pro. an example of measurement parameters includes measurement magnification: 8000 times, min contrast: 0.5, merge shared borders: 0.3, exclude edge pores: on, conductance: 0.3, and min detection size: 1.0.

The hydrophilic polymer preferably has at least one of polyvinyl alcohol, polyvinylpyrrolidone, methoxy polyethylene oxide methacrylate, polyacrylic acid, polyethyleneimine, polyvinyl amine, cyclodextrin, and methyl cellulose, for example. A contact angle with water in the hydrophilic polymer is, for example, over 0 degree and 90 degrees or less.

A thickness of the diaphragm 13 is preferably 5 μm or more and 500 μm or less, more preferably 10 μm or more and 400 μm or less, and further preferably 20 μm or more and 300 μm or less. When the thickness is less than 1 μm, mechanical strength decreases, thereby causing problems during long-term operation. On the other hand, when the thickness exceeds 500 μm, migration of the electrolytic solution and ions is inhibited and cell voltage increases, which is not desirable.

The protective member 114 is provided between the anode 111 and the diaphragm 13. A first surface of the protective member 114 is provided on the anode 111. A second surface of the protective member 114 is provided on the opposite side of the protective member 114 from the first surface and is provided on the diaphragm 13.

The protective member is preferably an insulator. If the protective member 114 is made of a conductive material, an oxidation reaction of the diaphragm 13 may progress on the surface of the protective member 114. In order to prevent the oxidation reaction of the diaphragm 13, an electric resistivity of the protective member 114 is preferably $10^3$ Ωm or more, more preferably $10^4$ Ωm or more, and further preferably 105 Ωm or more. The protective member 114 has at least one inorganic material of a metal oxide, glass, and ceramics, for example. An upper limit of the electric resistivity of the protective member 114 is not limited in particular but is $10^{19}$ Ωm, for example.

The protective member 114 can transmit ions so as to allow ions to move between the anode 111 and the cathode 121. Permeation of ions through the protective member 114 can be achieved, for example, by a method of forming the protective member 114 using a porous material or by a method of forming an opening in the protective member 114. When the protective member 114 is porous, an average pore size of the protective member 114 is preferably 10 μm or more and 1000 μm or less, more preferably 30 μm or more and 900 μm or less, and further preferably 50 μm or more and 800 μm or less. The average pore size can be determined by the same method used to calculate the average pore size of the diaphragm 13.

In the electrolysis cell 10, since the ions permeate through the diaphragm 13 according to permeation of the electrolytic solution which is distributed to the anode 111 side, it is preferable that a water permeation rate of the protective member 114 is larger than a water permeation rate of the diaphragm 13. When the water permeation rate of the protective member 114 is preferably two or more times the water permeation rate of the diaphragm 13 and more preferably five or more times the water permeation rate of the diaphragm 13, the protective member 114 does not hamper permeation of ions and the cell exhibits a high efficiency. The water permeation rate is measured according to DIN 53137, which is one of German industrial standards.

A thickness of the protective member 114 is preferably 5 μm or more and 1000 μm or less. When the thickness is less than 5 μm, mechanical strength of the protective member 114 cannot be ensured, and the protective member 114 becomes easy to be broken during cell tightening or during operation. Further, when the thickness exceeds 1000 μm, an electric resistivity of the protective member 114 becomes high to thereby raise cell voltage. When the thickness of the protective member 114 is more preferably 5 μm or more and 800 μm or less and further preferably 5 μm or more and 500 μm or less, it becomes possible to achieve a cell with high mechanical strength and low cell voltage.

Next, an operation example of the device of the embodiment will be described. Here, there is mainly described a case where the device 1 illustrated in FIG. 1 generates carbon monoxide as the carbon compound, but the carbon compound as the reduction product of carbon dioxide is not limited to carbon monoxide. The carbon compound may be methane, formic acid, ethane, ethylene, methanol, ethanol, ethylene glycol, or the like as described above, and it is possible to further reduce carbon monoxide being the reduction product to generate the organic compound mentioned above. When a carbon compound in a solution state is to be generated, it is preferable to use the electrolysis cell 10. Further, a reaction process by the electrolysis cell 10 is considered to be generating mainly hydrogen ions (H$^+$) or generating mainly hydroxide ions (OH$^-$), but is not limited to either of the above reaction processes.

The reaction process of mainly oxidizing water (H$_2$O) to generate hydrogen ions will be described. When an electric current is supplied between the anode 111 and the cathode 121 from the power supply 20, an oxidation reaction of water (H$_2$O) occurs in the anode 111 provided on the anode solution. More specifically, as indicated by a formula (1) below, H$_2$O contained in the anode solution is oxidized to generate oxygen (O$_2$) and hydrogen ions (H$^+$).

$$2H_2O \rightarrow 4H^+ + O_2 + 4e^- \tag{1}$$

The H$^+$ generated in the anode 111 moves in the electrolytic solution existing in the anode 111 and the protective member 114, and the diaphragm 13, to reach a vicinity of the cathode 121. A reduction reaction of carbon dioxide (CO$_2$) is caused by electrons (e$^-$) based on the electric current supplied from the power supply 20 to the cathode 121 and the H$^+$ having moved to the vicinity of the cathode 121. More specifically, as indicated by a formula (2) below, carbon dioxide supplied from the gas flow path 122a to the cathode 121 is reduced to generate carbon monoxide. Further, as indicated by a formula (3) below, the hydrogen ions receive the electrons to thereby generate hydrogen. At this time, hydrogen may be generated simultaneously with carbon monoxide.

$$CO_2 + 2H^+ + 2e^- \rightarrow CO + H_2O \tag{2}$$

$$2H^+ + 2e^- \rightarrow H_2 \tag{3}$$

Next, the reaction process of mainly reducing carbon dioxide (CO$_2$) to generate hydroxide ions (OH$^-$) will be described. When an electric current is supplied between the anode 111 and the cathode 121 from the power supply 20, water (H$_2$O) and carbon dioxide (CO$_2$) are reduced in the vicinity of the cathode 121 to generate carbon monoxide (CO) and hydroxide ions (OH$^-$), as indicated by a formula (4) below. Further, as indicated by a formula (5) below, water receives electrons to thereby generate hydrogen. At this time, hydrogen may be generated simultaneously with carbon monoxide. The hydroxide ions (OH$^-$) generated by the above reactions diffuse in a vicinity of the anode 111, and the hydroxide ions (OH⁻) are oxidized to generate oxygen (O₂), as indicated by a formula (6) below.

$$2CO_2 + 2H_2O + 4e^- \rightarrow 2CO + 4OH^- \tag{4}$$

$$2H_2O + 2e^- \rightarrow H_2 + 2OH^- \tag{5}$$

$$4OH^- \rightarrow 2H_2O + O_2 + 4e^- \tag{6}$$

The device 1 is not only specialized in the reduction of carbon dioxide, but can also produce a carbon dioxide reduced substance and hydrogen at an arbitrary ratio, that is, for example, can generate carbon monoxide and hydrogen at a ratio of 1:2 to produce methanol in a subsequent chemical reaction.

Since hydrogen is an inexpensive and readily available raw material from water electrolysis or fossil fuel, it is not necessary to have a large ratio of hydrogen. From such a viewpoint, it is preferable that a ratio of carbon monoxide to hydrogen is at least one or more, more preferably 1.5 or more, considering economic efficiency or environmental friendliness.

As described above, the device of the embodiment has the protective member 114 which protects the diaphragm 13 between the anode 111 and the diaphragm 13.

Figure 3:
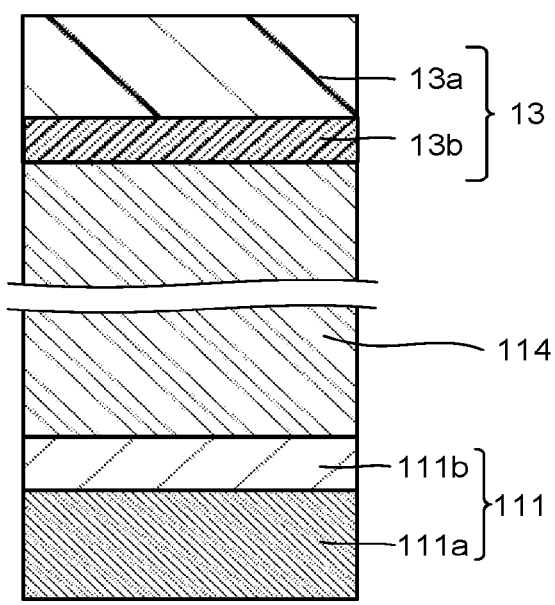
FIG. 3 is an enlarged diagram of a part of the device illustrated in FIG. 1.

FIG. 3 is a cross-sectional diagram illustrating a part of the electrolysis cell 10 illustrated in FIG. 1. FIG. 3 partially illustrates the anode 111, the diaphragm 13, and the protective member 114. The anode 111 illustrated in FIG. 3 has a layer 111a which includes the aforementioned substrate (support), and a layer 111b which is provided on the layer 111a and includes the aforementioned oxidation catalyst. The diaphragm 13 illustrated in FIG. 3 has a layer 13a which includes the aforementioned porous film and a layer 13b which includes the aforementioned hydrophilic polymer supported on the layer 13a.

When configuring a carbon dioxide electrolysis device, it is effective to realize a configuration in a mode similar to that of a fuel cell such as a polymer electric fuel cell (PEFC), for example. More specifically, by directly supplying carbon dioxide to a catalyst layer of a cathode, a carbon dioxide reduction reaction can proceed quickly.

In such a mode, selection of a diaphragm separating the cathode and an anode is important. The diaphragm is required to have a high gas barrier property in order to prevent mixing of a gas (for example, oxygen) generated in an anode part and a gas (for example, carbon monoxide) generated in a cathode part. Further, in the device as above, a medium carrying electricity (electron) is an ion, and a high ion permeability is required of the diaphragm for the sake of efficient progress of the reaction.

In the PEFC, a stable film made of a cation exchange resin, such as Nafion (registered trademark) manufactured by Dupont or Fremyon (registered trademark) manufactured by AGC Inc., for example, is used. When such a film is used for a diaphragm of a carbon dioxide electrolysis device, generation of hydrogen being a side reaction becomes dominant and a reaction efficiency decreases. On the other hand, when an anion exchange resin such as Sustenion (registered trademark) manufactured by Dioxide Materials, Inc. is used, hydrogen generation is prevented, but at present such a film has poor thermal and mechanical stability and has a problem in durability.

One of methods to solve the aforementioned problems which occur when using the ion exchange film is to use a porous film without ion permeation selectivity for a diaphragm. In this method, ions permeate through the diaphragm by direct migration of an electrolytic solution. This method has been studied also in alkaline water electrolysis or the like, and a method to supply a stable diaphragm is proposed.

The aforementioned technology relates to a manufacturing method and a feature of a special hydrophilic porous film, and has a problem of a cost or a supply amount of the film when its practical implementation. If a film for which a manufacturing method is already established at present can be used, the aforementioned problem can be solved. For example, a hydrophilic porous film manufactured by supporting/applying a hydrophilic polymer on a surface of a hydrophobic film such as stable polytetrafluoroethylene (PTFE) is used in a wide field, and use of this film for an electrolysis cell is expected.

However, in a conventional electrolysis cell, an anode is provided on a diaphragm. For example, the absence of the protective member 114 leads to contact of the layer 13b of the diaphragm 13 to the layer 111b of the anode 111, in FIG. 3.

Contact between the anode and the diaphragm may progress an electrochemical oxidation reaction of the aforementioned polymer to change a composition, a shape, a pore size, a porosity, or the like, and thus cause deterioration of a function as the diaphragm or deterioration of mechanical strength.

In order to prevent oxidation of a diaphragm, it is necessary to prevent contact between the diaphragm and an anode. Contact can be prevented by a method of designing a cell to have a predetermined space between members, but in this case, adjusting a thickness of the space is difficult. The narrow space may cause the members to come into contact with each other when a flow rate of an electrolytic solution or a gas is changed, and the wide space raises cell voltage. Therefore, the thickness of the space is required to be adjusted meticulously, but the cell designed to have the predetermined space lacks ability to cope with such adjustment.

In contrast, the device of the embodiment has the protective member 114 to prevent contact between the anode 111 and the diaphragm 13 and thus prevent the aforementioned oxidation reaction. This enables a state of the diaphragm 13 to maintain and to prevent a decrease in electrolysis efficiency even after the device is operated for a long time. Further, the protective member 114 is easily adjustable by changing its thickness or its material, leading to easiness in management.

When the hydrophobic material such as PTFE is used for the diaphragm 13, it is required to grant a hydrophilic property by supporting a hydrophilic polymer or the like in order to transmit an electrolytic solution. When a film subjected to such a hydrophilization treatment is used for the diaphragm 13, a hydrophilizer is easily modified by the aforementioned oxidation reaction. As a result, the film becomes hydrophobic and hard to be permeated, to thereby cause crossover in which a gas on a cathode 121 side to move through a generated void to an anode 111 side, resulting in deterioration in performance. For the above reasons, it is considered that insertion of the protective member 114 at the time of using the hydrophilic film brings about an effect of improving durability. Many common hydrophobic materials such as PTFE have quite high thermal and chemical stability. This shows that if hydrophilicity can be maintained by insertion of the protective member as described above, such a hydrophobic material contributes to long time operation as a stable diaphragm 13.

EXAMPLES

Example 1

A carbon dioxide electrolysis device illustrated in FIG. 1 was fabricated according to the following procedure.

A cathode catalyst layer was fabricated by using spray coating. For an electrode substrate, carbon paper with a diffusion layer which has a microporous layer was used. In performing the spray coating, a coating solution in which a metal catalyst, pure water, isopropanol, and a Nafion solution are mixed at a predetermined ratio was sprayed onto the carbon paper. From the resultant, a 4×4 cm portion was cut out to obtain a cathode (electrode area: 16 cm$^2$).

For an anode, an electrode coated with $IrO_2$ nanoparticles as a catalyst on a Ti mesh was used. From the $IrO_2$/Ti mesh, a 4×4 cm portion was cut out to obtain the anode.

An electrolysis cell was fabricated by laminating a cathode current collector, a gas flow path, the cathode, a diaphragm, a protective member, the anode, an electrolytic solution flow path, and an anode current collector in order from the top, sandwiching the laminate by an unillustrated support plate, and further, fastening the above by a bolt. Further, the anode current collector and the cathode current collector were connected to an external power supply, whereby the electrolysis device illustrated in FIG. 1 was fabricated.

For the diaphragm, a hydrophilized PTFE film, i.e., POREFLON (registered trademark) manufactured by Sumitomo Electric Industries, Inc. was used. A nominal pore size is 0.05 μm and a nominal thickness is 30 μm. The time required for 25 mL of water to permeate through the diaphragm was measured to be 48 seconds according to DIN 53137.

Glass cloth manufactured by UNITIKA LTD. was used for the protective member. A nominal weave density is 70 fibers per 25 mm, a nominal thickness is 25 km, an electric resistivity of the glass fiber is $10^{17}$ Ωm. The time required for 25 mL of water to permeate through the protective member was measured to be less than 1 second according to DIN 53137.

The aforementioned electrolysis device was operated under following conditions. A predetermined amount of carbon dioxide gas was supplied to the gas flow path and a sodium hydrogen carbonate aqueous solution (concentration: 0.1 M) was made to flow in the electrolytic solution flow path. A constant current of 400 mAcm$^{-2}$ was continuously applied between the anode and the cathode. Further, a gas generated from the cathode side was collected every 10 minutes and quantified by gas chromatography to calculate a CO generation Faraday's efficiency. The CO generation Faraday's efficiency by this cell was 90% after the start of electrolysis and was maintained at this level for 50 hours.

Comparative Example 1

A cell was assembled in the same way as in Example 1, except that a protective member was not inserted, and evaluation was performed in the same way as in Example 1. In this case, a CO generation Faraday's efficiency was 90% after the start of electrolysis, but the efficiency gradually decreased to be 80% after 16 hours. This is considered to be caused by change of a property of a diaphragm due to loss of a hydrophilized material of a PTFE film by electrochemical oxidation. This indicates that insertion of a protective member improves durability to bring about an effect to improve an electrolysis efficiency.

The configurations of the aforementioned respective embodiments can be mutually combined to be carried out, and a part thereof can be substituted. Here, while certain embodiments of the present invention have been described, these embodiments have been presented by way of example only, and are not intended to limit the scope of the inventions. The embodiments described herein may be embodied in a variety of other forms, furthermore, various omissions, substitutions, changes, and so on may be made therein without departing from the spirit of the inventions. The accompanying claims and their equivalents are intended to cover such forms or modifications as would fall within the scope and spirit of the inventions.

What is claimed is:

1. A carbon dioxide electrolysis device, comprising:
   an anode configured to oxidize water or a hydroxide ion and thus generate oxygen;
   an anode solution flow path configured to supply an anode solution to the anode;
   a cathode configured to reduce carbon dioxide to generate a carbon compound;
   a gas flow path configured to supply a gas to the cathode, the gas containing carbon dioxide;
   a diaphragm provided between the anode and the cathode and including a porous film with a hydrophilic polymer supported thereon; and
   a protective member provided between the anode and the diaphragm and protecting the diaphragm.

2. The device according to claim 1, wherein
   the cathode is provided on the diaphragm.

3. The device according to claim 1, further comprising a cathode solution flow path configured to supply a cathode solution to the cathode.

4. The device according to claim 3, wherein
   the cathode has a first surface facing on the gas flow path and a second surface facing on the cathode solution flow path; and
   the cathode solution flow path is provided between the diaphragm and the cathode such that the cathode solution is provided on the diaphragm and the cathode.

5. The device according to claim 3, wherein
   the cathode solution contains at least one ion selected from the group consisting of a phosphate ion, a borate ion, a sodium ion, a potassium ion, a calcium ion, a lithium ion, a cesium ion, a magnesium ion, a chloride ion, a hydrogen carbonate ion, and a carbonate ion.

6. The device according to claim 1, wherein
   the anode solution contains at least one ion selected from the group consisting of a phosphate ion, a borate ion, a sodium ion, a potassium ion, a calcium ion, a lithium ion, a cesium ion, a magnesium ion, a chloride ion, a hydrogen carbonate ion, and a carbonate ion.

7. The device according to claim 1, wherein
   the porous film has at least one selected from the group consisting of polytetrafluoroethylene, polyetheretherketone, polyethylene, polyphenylsulfone, polysulfone, polyethersulfone, polyacrylonitrile, polyetherimide, polyamideimide, polyvinylidene fluoride, polycarbonate, polyester, acrylic, nylon, polyolefin, polyurethane, and polypropylene.

8. The device according to claim 1, wherein
   the hydrophilic polymer contains at least one selected from the group consisting of polyvinyl alcohol, polyvinylpyrrolidone, methoxy polyethylene oxide methacrylate, polyacrylic acid, polyethyleneimine, polyvinyl amine, cyclodextrin, and methyl cellulose.

9. The device according to claim 1, wherein
the protective member includes an insulator having an electric resistivity of $10^3$ Ωm or more and $10^{19}$ Ωm or less.

10. The device according to claim 1, wherein
the protective member contains at least one selected from the group consisting of a metal oxide, glass, and ceramics.

11. The device according to claim 1, wherein
a permeation rate of water through the protective member is equal to or more than a permeation rate of water through the diaphragm.

12. The device according to claim 1, wherein
the protective member includes:
a third surface on the anode; and
a fourth surface on the diaphragm.

13. The device according to claim 1, wherein
the anode includes:
a support; and
an oxidation catalyst supported on the support.

14. The device according to claim 1, further comprising
a power supply configured to supply an electric current between the anode and the cathode.

* * * * *